(12) United States Patent
Coronado et al.

(10) Patent No.: US 6,923,260 B2
(45) Date of Patent: Aug. 2, 2005

(54) MITIGATION OF PROPPANT STICKING IN REMOVING DOWNHOLE TOOLS

(75) Inventors: Martin P. Coronado, Cypress, TX (US); William Russell Wood, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 166 days.

(21) Appl. No.: 10/438,384

(22) Filed: May 15, 2003

(65) Prior Publication Data

US 2003/0217846 A1 Nov. 27, 2003

Related U.S. Application Data

(60) Provisional application No. 60/382,960, filed on May 23, 2002.

(51) Int. Cl.[7] ...................... E21B 43/267; E21B 33/138
(52) U.S. Cl. ...................... 166/276; 166/280; 166/295; 166/308; 507/219; 507/200
(58) Field of Search ................................ 166/276, 280, 166/281, 295, 308; 507/924, 219; 428/405, 407; 523/131

(56) References Cited

U.S. PATENT DOCUMENTS

| | | | |
|---|---|---|---|
| 5,120,708 A | | 6/1992 | Melear et al. |
| 5,260,268 A | | 11/1993 | Forsberg et al. |
| 5,381,864 A | * | 1/1995 | Nguyen et al. ......... 166/280.1 |
| 5,415,230 A | | 5/1995 | Fisk, Jr. et al. |
| 5,420,174 A | * | 5/1995 | Dewprashad ............... 523/130 |
| 5,555,937 A | | 9/1996 | Fisk, Jr. et al. |
| 5,595,245 A | | 1/1997 | Scott, III |
| 5,604,184 A | * | 2/1997 | Ellis et al. ................... 507/117 |
| 5,609,207 A | * | 3/1997 | Dewprashad et al. ....... 166/276 |
| 5,671,810 A | | 9/1997 | Hodge et al. |
| 5,924,487 A | | 7/1999 | Oneal et al. |
| 5,988,271 A | | 11/1999 | Oneal et al. |
| 6,148,917 A | | 11/2000 | Brookey et al. |
| 6,311,773 B1 | * | 11/2001 | Todd et al. .............. 166/280.2 |
| 6,439,309 B1 | * | 8/2002 | Matherly et al. ........... 166/276 |

OTHER PUBLICATIONS

PCT ISA/EP Search Report for Application No. PCT/US03/16002, Nov. 28, 2003.

* cited by examiner

*Primary Examiner*—Frank Tsay
(74) *Attorney, Agent, or Firm*—Madan, Mossman & Sriram P.C.

(57) ABSTRACT

It has been discovered that sticking caused by proppants used in a frac pack or gravel pack operation during hydrocarbon recovery efforts can be mitigated by placing a proppant anti-sticking fluid in a downhole space, such as an annulus adjacent a tool system or service tool. An operation is conducted that involves passing a carrier fluid including a proppant through the tool system. The carrier fluid is gelled and optionally crosslinked. The proppant anti-sticking fluid is flushed through the tool system to break the gel, contact the proppant and substantially clear the proppant from the tool system. Finally, the tool system is removed from downhole. The proppant anti-sticking fluid includes a diluent, such as an aqueous fluid, a brine, or a non-aqueous fluid, and an effective amount of a gel-breaking component to break the gel, and may, but does not necessarily include a surface tension-reducing compound, such as a surfactant.

19 Claims, 5 Drawing Sheets

MITIGATION OF PROPPANT STICKING IN REMOVING DOWNHOLE TOOLS

This application claims the benefit of U.S. Provisional Application No. 60/382,960 filed May 23, 2002.

FIELD OF THE INVENTION

The present invention relates to carrier fluids used in fracturing or gravel packing subterranean formations during hydrocarbon recovery operations, and more particularly relates, in one embodiment, to methods and fluids useful in mitigating sticking of equipment caused by proppants in frac pack and gravel pack operations.

BACKGROUND OF THE INVENTION

"Frac packing" is a combination of gravel packing and fracturing operations in unconsolidated subterranean formations in a hydrocarbon recovery endeavor. Modern frac packing operations utilize high-strength proppants in place of ordinary sand, which is typically used in gravel packing. The high crush resistance of the proppant, which is typically manufactured from either ceramic or bauxite material, allows fractures in the formation created during the hydraulic fracturing operation to remain open after pressure is released and the proppant is packed in the fracture tunnels. Ordinary sand used in this application would simply be crushed, due to the overburden pressure (closure stress) in the formation, allowing the fractures to close again and severely limit fluid inflow potential (i.e. the production of hydrocarbons). Without wishing to be limited to any particular theory, it appears that the harder the proppant used, the greater the problem with sticking. Of course, these same kinds of proppants are used in gravel packing operations that do not involve fracturing.

The use of these high-strength proppant materials can create a potentially severe problem for the downhole tool operation. Proppant wedged between the outer packer assembly and the internal service tool string (which is used to place the proppant) can cause the service tool to become stuck within the packer (and/or the seal bores). The available pulling limitation of the drill pipe workstring will not allow the proppant to be crushed or allow further movement of the service tool after initial sticking. This situation potentially leads to a very costly fishing operation, and delays the well being put on production.

The Baker Hughes CK FRAQ tool system illustrated in FIGS. 1A–1E incorporates an intermediary reverse circulation position (FIG. 1D) that is intended to allow the proppant in the tool system, after the fracturing operation is complete, to be circulated out prior to attempting to pull the service tool out of the packer. Unfortunately, this method is only partially successful in removing all of the proppant due to the propensity of the proppant to "stick" or adhere to the service tool. Without wishing to be limited to any particular theory, the "sticking" characteristic of the proppant is thought to be due to either a static electrical charge between the proppant and the steel of the service tool, cohesive forces of the carrier fluid, adhesive forces between the carrier fluid and the alloy or steel of the service tool or a combination of all. The attractive force between the proppant and/or the carrier fluid and steel results in failure to remove all of the excess proppant, which in some cases leads to sticking of the tool system.

It would be desirable if methods and/or compositions could be devised that would reduce or eliminate the sticking or wedging of proppant, in particular high strength proppant, to the tool system, the packer assembly or both to reduce the sticking of the tool system in the packer.

SUMMARY OF THE INVENTION

Accordingly, it is an object of the present invention to provide a method for mitigating the sticking of proppant in a frac pack or gravel pack operation.

It is another object of the present invention to provide a proppant anti-sticking fluid that would mitigate the sticking of proppant in a frac pack or gravel pack operation.

In carrying out these and other objects of the invention, there is provided, in one form, a method of mitigating proppant sticking in a downhole fracturing or gravel packing operation that involves placing a proppant anti-sticking fluid in a downhole space. The proppant anti-sticking fluid includes a diluent and a gel-breaking effective amount of a gel breaking component. A fracturing or gravel packing operation is conducted. A carrier fluid is passed through a tool system, and the carrier fluid includes a proppant. The carrier fluid is a low viscosity fluid such as water or brine, a gelled fluid or a gelled and crosslinked fluid. The proppant anti-sticking fluid is flushed through the tool system to contact gelled carrier fluid and the proppant, and to substantially break the gel and clear the proppant from the tool system. The tool system is removed from downhole.

It is not necessary for the method to be practiced in the sequence noted above. In one non-limiting aspect, the gelling of the carrier fluid may occur or begin to occur prior to passing the fluid through the tool system. In another non-limiting embodiment of the invention, placement of the proppant anti-sticking fluid does not necessarily need to occur first. Other sequence variations may be devised by one of ordinary skill in the art that fall within the scope of this invention.

Figure 1A:
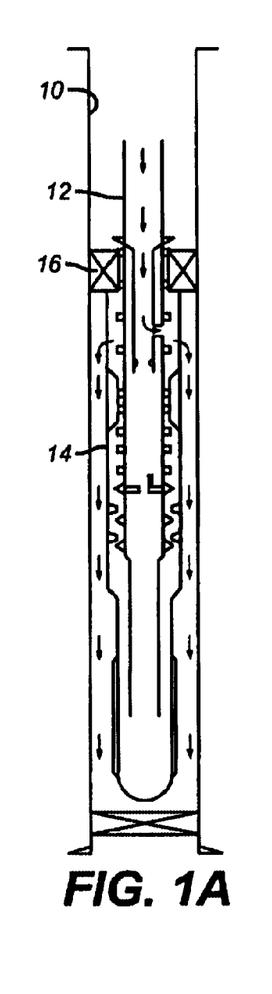
FIG. 1A is a schematic, cross-section illustration of a run in stage and frac position of a service tool for a traditional frac pack tool operation.
Figure 1B:
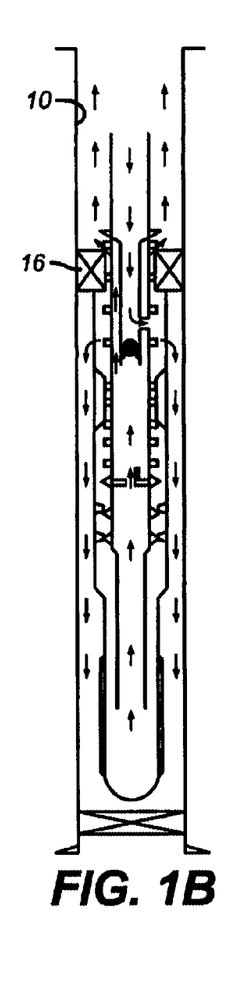
FIG. 1B is a schematic, cross-section illustration of the service tool in the circulation position of a traditional frac pack tool operation.
Figure 1C:
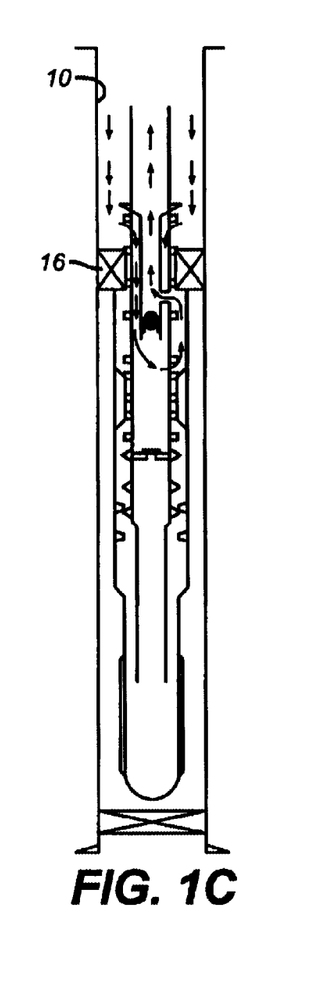
FIG. 1C is a schematic, cross-section illustration of the service tool in the evacuation position of a traditional frac pack tool operation.
Figure 1D:
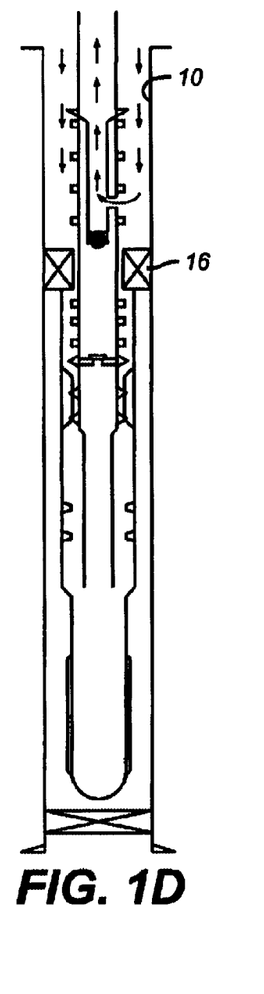
FIG. 1D is a schematic, cross-section illustration of the service tool in the reverse position of a traditional frac pack tool operation, where the fluid is circulated in the opposite direction from FIG. 1B.
Figure 1E:
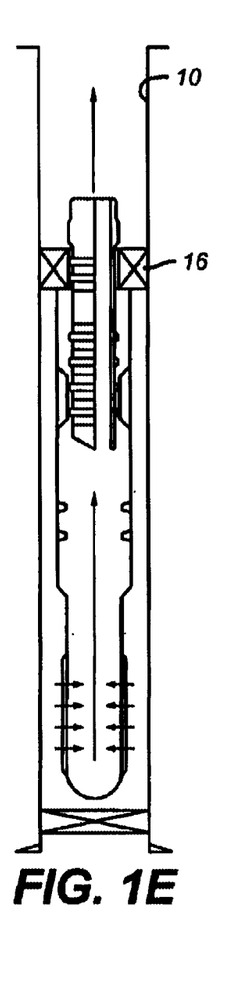
FIG. 1E is a schematic, cross-section illustration of the service tool in the position for producing hydrocarbons from the subterranean formation.
Figure 2A:
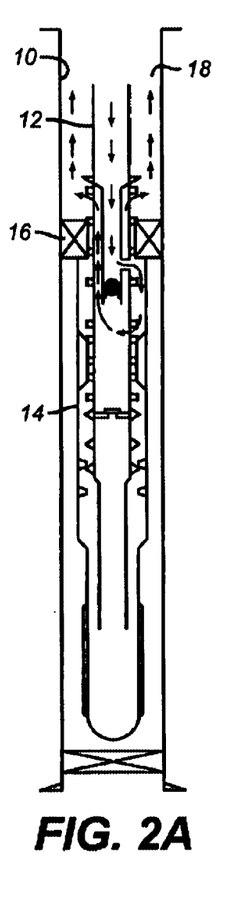
FIG. 2A is a schematic, cross-section illustration of the service tool in a spotting position for placing a proppant anti-sticking fluid into the annulus above the gravel pack packer.
Figure 2B:
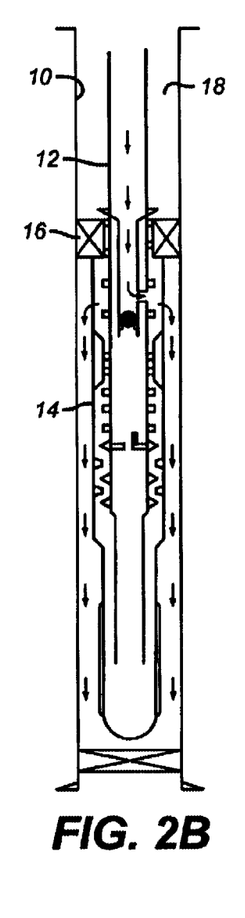
FIG. 2B is a schematic, cross-section illustration of the service tool in the position for the fracturing operation (analogous to FIG. 1B)
Figure 2C:
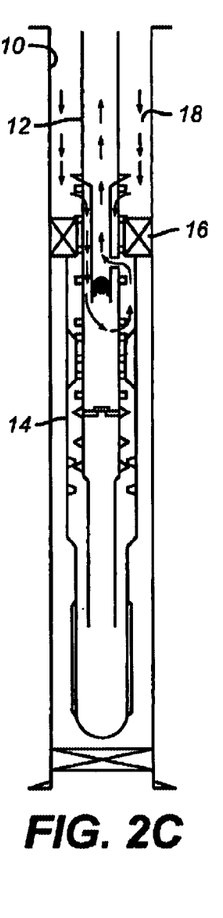
FIG. 2C is a schematic, cross-section illustration of the service tool in the evacuation position for the method of this invention (analogous to FIG. 1C)

It will be appreciated that FIGS. 1 and 2 are not to scale and are provided for illustrative purposes only. The invention is understood as not necessarily limited by the features and proportions shown in the Figures. Equivalent SI units for the values given in FIGS. 3–5 can be found in Table I, infra.

DETAILED DESCRIPTION OF THE INVENTION

The present invention reduces or eliminates the attractive, adherent, clinging, and/or "sticking" force between the proppant and a service tool by introducing a specially designed fluid into and around the tool system prior to pulling the service tool out of the packer assembly after the fracturing operation. This proppant anti-sticking fluid (PASF) or anti-cling fluid (ACF) will mitigate the cohesive and adhesive forces effect and/or the static charge attraction and/or other adherent force thus allowing the proppant to be essentially completely circulated out of the tool system in the intermediate reverse circulation (evacuation or evac) position, in one non-limiting embodiment of the invention.

In the context of this invention, proppant is defined to include, but is not necessarily limited to, ceramic particles, bauxite particles, sand, composite materials currently in use or yet to be developed, and other particulate matter used to filter or prop open a fracture or form a gravel pack. Of course, "proppant" also includes mixtures or other combinations of these materials.

In a fracturing or gravel packing operation, the proppant is carried into the zone or zones where it is to be placed by a carrier fluid. The carrier fluid may be aqueous or brine, in one non-limiting embodiment of the invention. The carrier fluid should be gelled, and may be gelled by any of the polymeric gelling systems known in the art including, but not necessarily limited to, e.g. guar, guar derivatives (HPG, CMHPG), hydroxyethylcellulose (HEC), or any viscoelastic surfactant (VES). Using a gelled carrier fluid would increase the sweep efficiency of the fluid (proppant transport effectiveness) when the fluid is passed through the tool. Polymeric systems may be gelled further by crosslinking the polymers, such as with borate ion, zirconate ion, titanate ion, other metallic and semi-metallic crosslinkers or other suitable ion. It is permissible, but not necessary for the polymer to be crosslinked in this method.

FIGS. 2A through 2C schematically illustrate an internal service tool 12 within an outer packer assembly 14 inside a borehole having a borehole wall 10. In operation, the PASF would, in one non-limiting embodiment of the invention, be spotted in the annulus 18 above the gravel pack packer 16 prior to pumping the proppant into the well and commencing the fracturing operation. It will be appreciated that the PASF may be placed in any convenient space, annulus, volume, etc. adjacent the tool system within the method of the invention, and is not necessarily limited to the annulus space 18 immediately above the gravel pack packer. The PASF would remain in the "dead space" 18 above the packer, e.g., such as during gravel pack or frac pack operations as seen in FIG. 2B. Once the tool is in the "evacuation" position (FIG. 2C), reverse circulation and clean up is begun and the fluid would be flushed through the tool string, eliminating the viscous or attractive or "sticking" force on the proppant, and allowing essentially all of the proppant to be circulated clear of the tool string 12. Once the proppant is removed, the tool string 12 can be pulled from the packer 14 bore with a greatly reduced probability of sticking due to wedged proppant. By "essentially all" of the proppant, it is meant a sufficient amount or proportion to permit the tool string to be pulled from the packer bore without sticking, stopping or extraordinary force, and/or using only or essentially only the normal or usual force to remove the tool string. This is the same as "substantially clearing" all of the proppant from the tool system.

It will be appreciated that the invention is not limited to the particular tool 12 or procedure shown in FIGS. 2A–2C. For instance, tool 12 movement is shown between the Figures for this particular tool 12 to open or close passageways or ports for the desired circulation. However, it will be appreciated that some current and future tools may not necessarily require movement of the entire tool to permit the PASF to contact the gelled fluid and the proppant.

In a multi-zone operation where multiple zones are fractured in a single tool string run, the PASF would be spotted above the packer 16 (or other suitable location) prior to treatment in each zone, in one non-limiting embodiment. The PASF would be of increased value in these multiple zone operations since the potential for sticking is multiplied by the number of zones to be treated (i.e., the number of individual fracturing operations).

The proppant anti-sticking fluid may comprise primarily an aqueous fluid, a brine, a non-aqueous fluid, an emulsion or the like. Any of the conventionally used brines are acceptable as PASF components. The PASF must have a gel breaking component in an amount effective to break the gel of the particular gelled carrier system involved. The breaking must occur relatively quickly; in one non-limiting embodiment, this is a matter of minutes; in one non-limiting embodiment, less than 10 minutes, and in another non-limiting embodiment less than 5 minutes. Thus, while the carrier fluid and/or the PASF may contain some of the typical or conventional delayed gel breaking systems such as enzymes and delayed oxidizers, these components are generally too slowly acting to function in a method for inhibiting proppant sticking.

In one general, but non-limiting embodiment of the invention, the gel breaking component is a material or compound capable of reducing the pH of the carrier fluid. This will typically be an acid, in one non-limiting embodiment, an organic acid although mineral acids, such as halogen acids, e.g. HCl, HF, etc. may also be employed. Of course, the use of a strong acid may have other disadvantages to be considered, including, but not necessarily limited to, corrosion of the tools and other tubular goods the acid comes into contact with and a lowered buffering capacity compared to the organic acids. Suitable organic acids include, but are not necessarily limited to, acetic acid, formic acid, propionic acid, dicarboxylic acids, and the like and mixtures thereof. With many polymeric gelled systems and crosslinked polymeric gelled systems, when the pH is lowered to a particular point, the gel will break and become much less viscous. In crosslinked polymer gelled systems, the breaking often occurs with the removal of the crosslinking ion once a suitably low pH is reached. In other crosslinked polymer gelled systems, the low pH can catalyze enzymatic reactions and produce faster polymer degradation. Again, the exact pH to be accomplished will depend on the system involved, and will include such factors as the brine composition of the PASF, the temperature of the PASF when it is flushed through the tool, the nature of the polymer, the nature of the crosslinking agent, and the like. In general, a suitable pH to be accomplished is between about 2 to about 7, in one non-limiting embodiment. In another non-limiting embodiment, the pH to be achieved is between about 3 to about 6, and yet in still an additional non-limiting embodiment, the pH should be reduced to about 3.5 to about 4.5 or about 4.

It is difficult, if not impossible to predict with accuracy the exact proportion of gel breaking component in the PASF since that proportion will depend upon a number of complex, interrelated factors including, but not necessarily limited to the strength of the acid, the nature of the gelled carrier fluid, whether the fluid is crosslinked, the particular crosslinking ion of the gelled system, the nature and mechanism of the gel breaking component, etc. However, to give some sense of the proportions of gel breaking component that might be used in the PASF, the proportion may range from about 0.1 to about 1.0 vol. % acid, in another non-limiting embodiment from about 0.15 to about 0.5 vol. %, and in still another non-limiting embodiment about 0.25 vol. % acid. These proportions are based on the total PASF.

In one non-limiting embodiment of the invention, the fluid includes a compound to reduce surface tension. Such a surface tension-reducing compound may be, but is not necessarily a surfactant. The surface tension-reducing compound is employed to remove or reduce the tendency of cohesive forces or capillary action to cause proppant to stick to a service tool or a packer assembly. A particularly important role for the surfactant is to help the gel breaking compound penetrate the interface of the metal and the carrier fluid. In another non-limiting embodiment of the invention, the fluid includes an anti-static compound. Such an anti-static compound may be, but is not necessarily a surfactant. The anti-static surfactant may be the same as or different from the surface tension-reducing surfactant. The anti-static compound is employed to reduce or eliminate the tendency of static electricity and/or magnetic force to cause proppant to stick to a service tool or a packer assembly. In still another non-limiting embodiment of this invention, the PASF may have more than one or all of these components to assist or help in removing proppant more thoroughly by a number of different mechanisms.

In some applications and/or systems, a surfactant may be very important to the effectiveness of the PASF. Once again, it is difficult, if not impossible, to define in advance what a suitable surfactant proportion would be since the proportion will depend upon a number of complex interrelated factors already mentioned. Nevertheless, in order to give some sense of what typical surfactant proportions might be, in one non-limiting embodiment, the surfactant proportion may range from about 0 to about 2 vol. % based on the total PASF, and in another non-limiting embodiment, may range from about 0.5 to about 1.5 vol. %, based on the PASF. As noted, however, the PASF will work in some applications with no surfactant present.

The invention will now be described with respect to particular Examples that are not intended to limit the invention but simply to illustrate it further in various non-limiting embodiments.

EXAMPLES 1–18

The inventive fluid has been observed to quickly remove clinging or adhered concentrated, crosslinked slurry (CCS) from the metal surface of a frac pack tool. The fluid consists of 1) brine: KCl or $CaCl_2$ which were tested in an anti-cling simulator; or $CaBr_2$, which was tested in the lab (other brines can be used); 2) 0 to 2% (v/v) of a proprietary surfactant and solvent blend; and 3) acetic acid—added to the surfactant solution to buffer the pH to approximately 4. As noted, other acids in addition to or alternative to acetic acid may be employed.

A borate crosslinked fluid was used in the anti-cling simulator testing. Because of pumping equipment limitations, the crosslinker was added as a batch mixed additive to a mixing tank. This limitation dictated the borate fluid had to be a highly delayed crosslinked system. This type of system was needed so that the crosslinker could be thoroughly mixed, the slurry could be pumped to the anti-cling simulator, and the fluid could be leaked off before the viscosity increase due to crosslinking occurred. Fortunately, this long crosslink delay time allowed the concentration of proppant in the tool by leak-off. It was observed that this method (proppant concentration by leak-off) provided the strongest cling (attraction) of slurry to tool while all other attempts at a "clinging" baseline (baseline—where the tool was flushed with brine only) gave insufficient cling times when the slurry was evacuated.

Fluid development was important because time was needed to 1) batch mix the crosslinker, 2) pump the fluid to the simulator, and 3) concentrate the proppant by leak-off. Once sufficient delay time was observed, the fluid was monitored for sufficient viscosity and elasticity development over time. Elasticity was important in these tests, because elastic gels tend to cling more strongly (stronger adhesive forces) to surfaces. If borate fluids are over-buffered or over-crosslinked, these fluids will synerese (lose water), lose elasticity and become brittle. As borate fluids synerese, a layer of water forms between the fluid and the surface to which the fluid is clinging. Once this phenomenon occurs, the slurry will not cling to any surface; therefore, it was critical that the crosslinked fluid be designed correctly.

The test results for all 18 anti-cling simulator tests are given in tabular (Table I) and graphical (FIGS. 3 and 4) form. The tests were grouped by base fluid: 9 ppg (1.1 kg/l) KCl, 10.5 ppg (1.26 kg/liter) $CaCl_2$, and fresh water. FIG. 5 contains data for the proposed anti-cling formulations in 9.0 ppg (1.1 kg/liter) KCl brine at flow rates of 1 and 2 bpm (0.16 and 0.32 $m^3$/min.). All tests were performed with the simulator in the vertical position. Based on experience with the test apparatus and the fluids, evac times inside a 2 to 3 minute window should be considered equivalent. The important information is how the anti-cling fluid compares to the baseline brine or another surfactant solution that is outside of the 3 minute window. There also may be some inherent error in the anti-cling simulator data due to the pressure limitations of the simulator. While the increased down-hole pressure will not affect the anti-cling fluid substantially, the increased pressure will probably change the anti-cling fluid/CCS/seal physical interaction.

Figure 3:
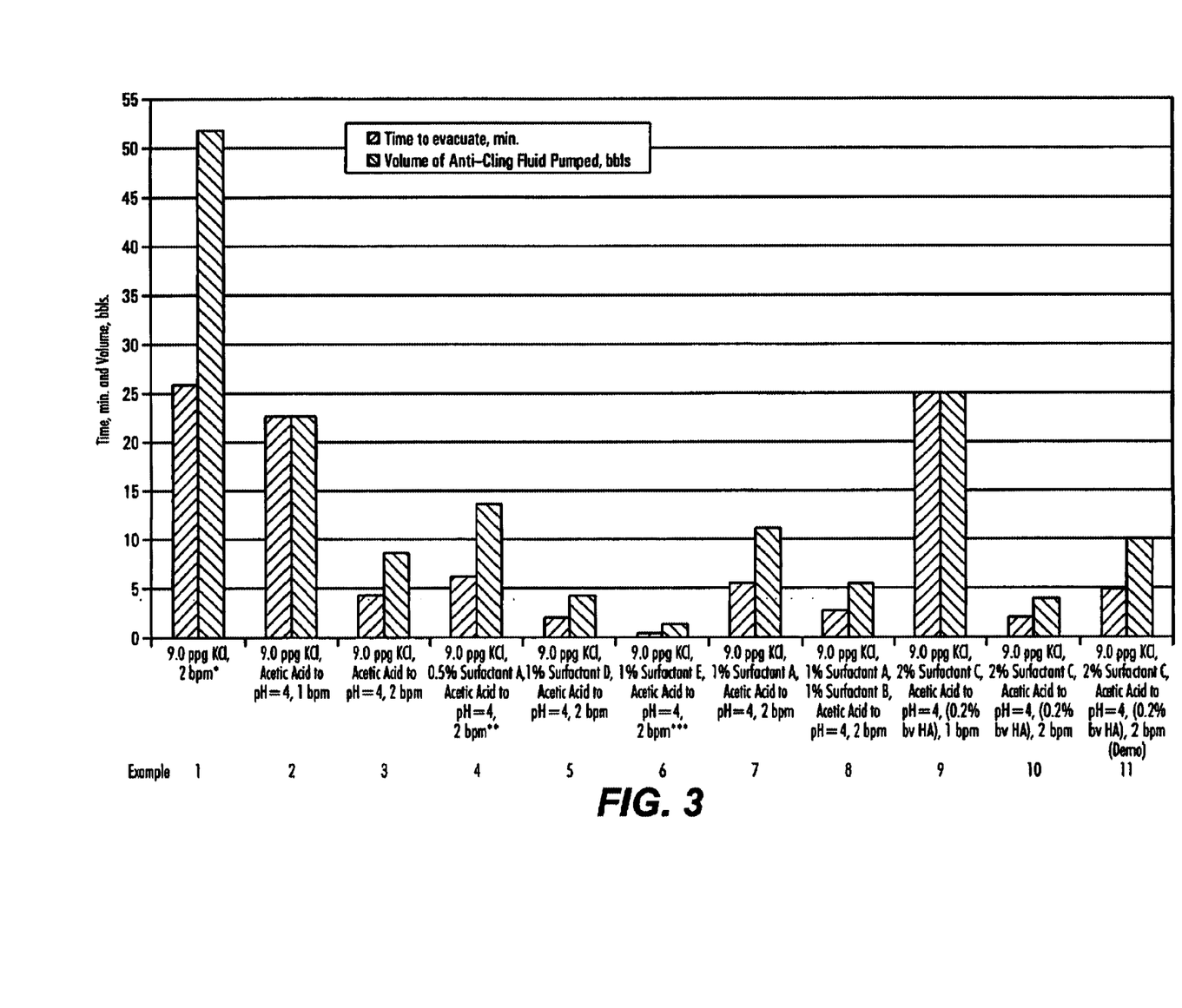
FIG. 3 is a chart of the time to evacuate and the volume of anti-cling fluid pumped for 9.0 ppg (1.1 kg/liter) KCl brines with various anti-cling additives.

FIG. 3 shows evac time and total volume pumped during evac for each test of anti-cling fluid in base 9.0 ppg (1.1 kg/liter) KCl brine. The formulations include base brine and nonionic surfactants (Surfactants A, B and C), a cationic surfactant (Surfactant D), an amphoteric surfactant (Surfactant E), or no surfactant. All of these anti-cling formulations are buffered to pH=4 with acetic acid except the baseline. In FIG. 3 the flow rate through the simulator for each test is also given with the formulation and is 1 bpm or 2 bpm (0.16 or 0.32 $m^3$/min.).

In FIG. 3, concentrating only on tests at 2 bpm (0.32 $m^3$/min) flow rate through the simulator, the cationic and amphoteric surfactants seem to do a good job of removing clinging CCS from the tool. However, in the test with Surfactant E, it was observed that the slurry was contaminated with 20/40 Unimin sand which was pumped as part of a clean-out fluid in the previous test. In laboratory solubility tests, both the Surfactant E and the Surfactant D produced insoluble films in 10.5 ppg (1.26 kg/liter) CaCl$_2$ brine and consequently were dropped from further testing. The nonionic surfactant Surfactant A and the nonionic blend Surfactant C were tested because of their high cloud-point temperatures. Nonionic surfactants can become insoluble at elevated temperatures and form a cloudy solution. The temperature at which the solution becomes cloudy is the cloud-point temperature. From FIG. 3 the nonionic formulation with 2% Surfactant C at pH=4 had the lowest evac time of 2 minutes and the lowest volume of anti-cling fluid pumped of 4 bbls.; however, in a repeat test, 2% Surfactant C at pH=4 had a 5 minute evac time and a volume pumped of 10 bbls. This difference in evac time was due to the variability of annulus packing. When compared to the baseline brine, the 2% Surfactant C formulation showed an average decrease in evac time of approximately 22.5 minutes and when compared to the evac times of the other nonionic formulations, 2% Surfactant C at pH=4 falls within a window of +/−2 minutes relative to the other formulations. Formulations with Surfactant A showed a trend of longer evac times compared to formulations with Surfactant C but still fell within a 3 minute window.

Figure 4:
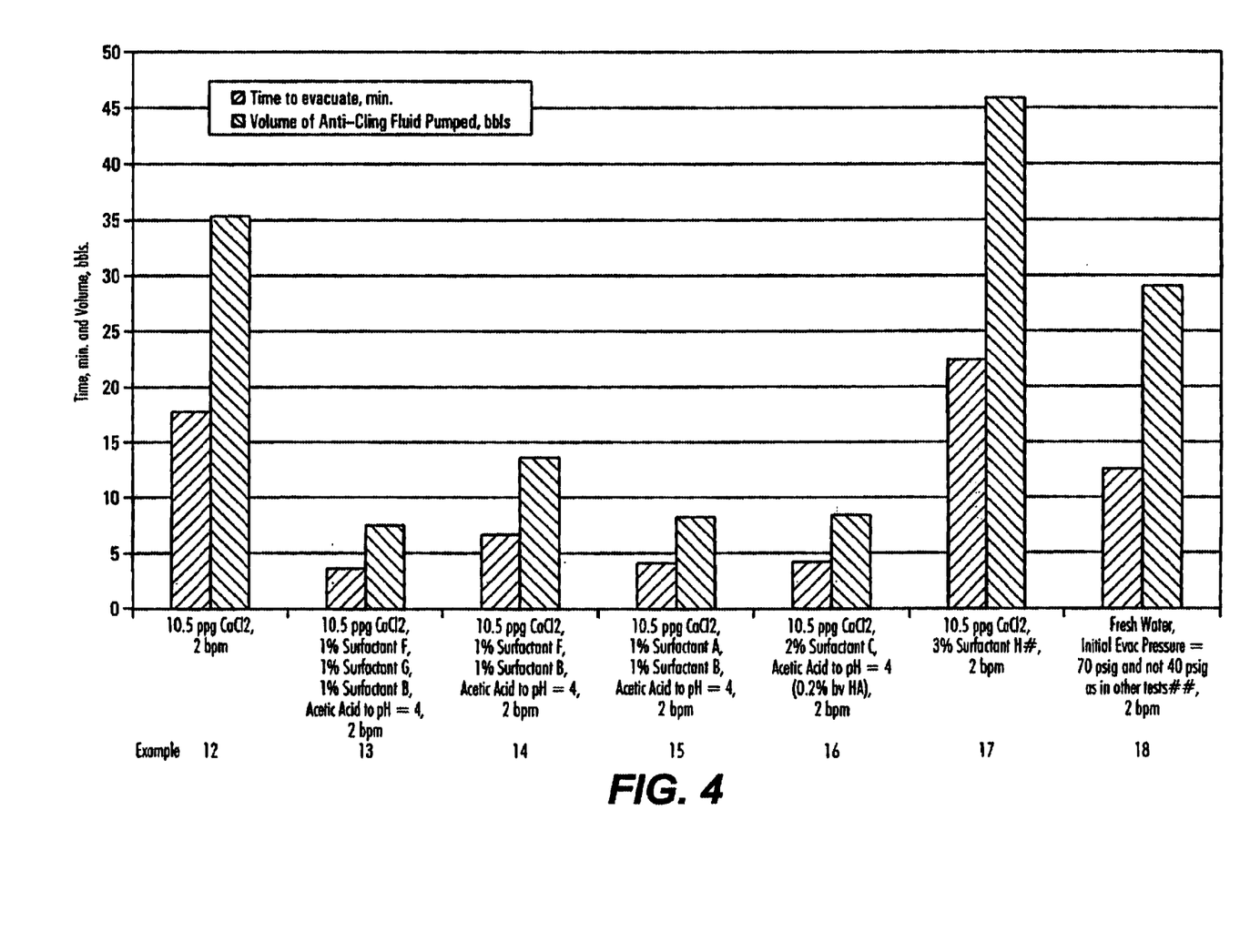
FIG. 4 is a chart of the time to evacuate and the volume of anti-cling fluid pumped for 10.5 ppg (1.26 kg/liter) $CaCl_2$ brines with various anti-cling additives.
Figure 5:
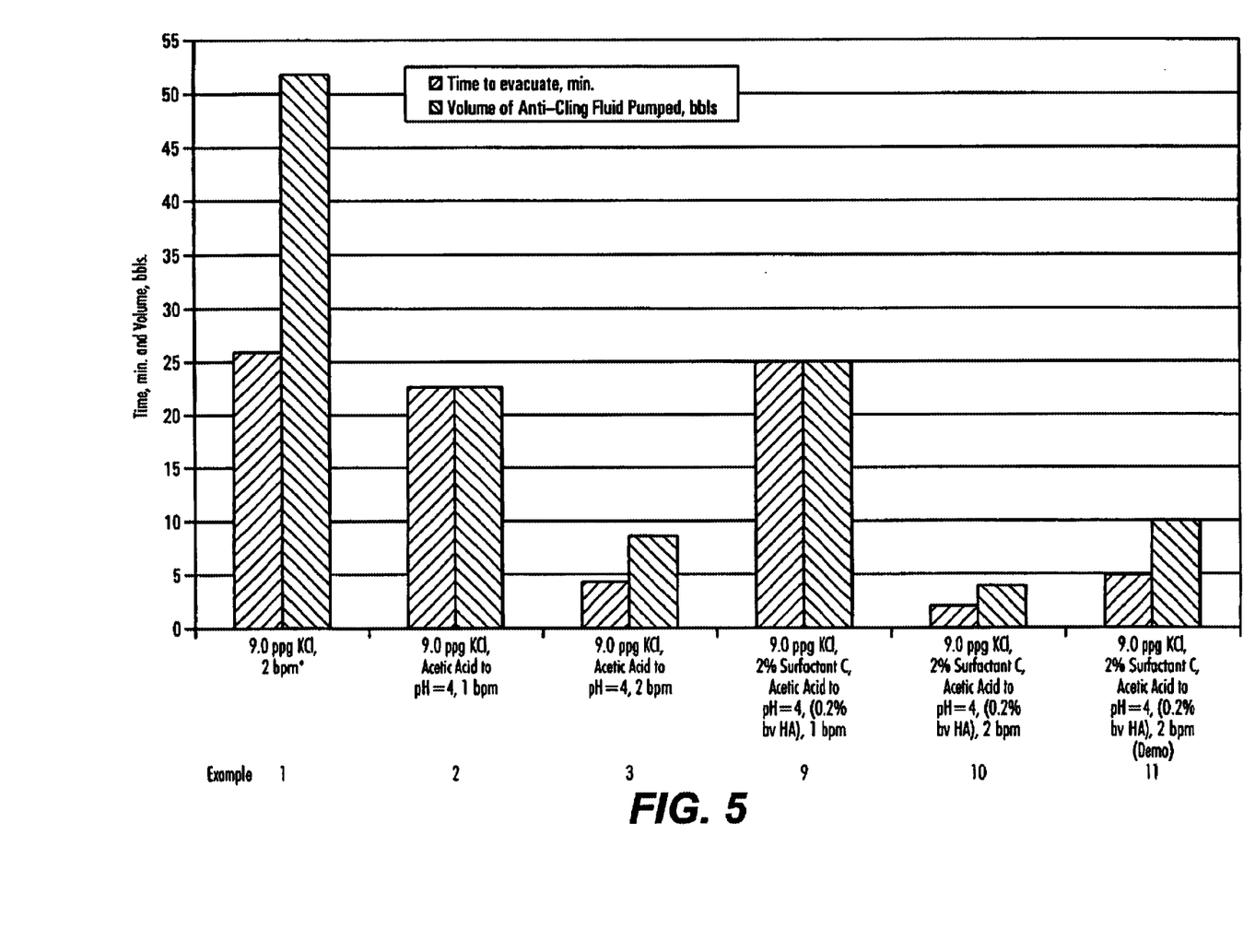
FIG. 5 is a chart of the time to evacuate and the volume of anti-cling fluid pumped for some select anti-cling formulations from FIG. 3 and baseline results for 1 and 2 bpm (0.16 and 0.32 m$^3$/min.) flow rates in 9.0 ppg (1.1 kg/liter) KCl brines.

FIG. 4 shows anti-cling formulations in base 10.5 ppg (1.26 kg/liter) CaCl$_2$ brine that include nonionic surfactants (Surfactants A, B, C, F and G) or a proprietary amphoteric surfactant (Surfactant H) from Baker Oil Tools. All of these anti-cling fluids except the Surfactant H solution were buffered to pH=4 with acetic acid. All anti-cling formulations with nonionic surfactants significantly reduced evac times when compared to the baseline 10.5 ppg (1.26 kg/liter) CaCl$_2$ brine (evac time=17.7 minutes) while the Surfactant H formulation with an increased solution viscosity exhibited a longer evac time (22.5 minutes) than the baseline. Three nonionic anti-cling formulations (1% Surfactant F, 1% Surfactant G, 1% Surfactant B at pH=4 and 1% Surfactant A, 1% Surfactant B at pH=4, and 2% Surfactant C at pH=4) were similar in their ability to remove the CCS with evac times of 3.75 minutes, 4.08 minutes, and 4.25 minutes respectively. The third formulation (1% Surfactant F, 1% Surfactant B at pH=4) may be somewhat less efficient at removing the CCS based on an evac time of 6.83 minutes.

FIG. 5 focuses on data generated at flow rates of 1 bpm and 2 bpm (0.16 m$^3$/min and 0.32 m$^3$/min) through the simulator using anti-cling fluids buffered to pH=4 with and without Surfactant C. The baseline 9.0 ppg (1.1 kg/liter) KCl brine at 2 bpm (0.32 m$^3$/min) gives an evac time of 26 minutes while the baseline brine buffered to pH=4 at 2 bpm (0.32 m$^3$/min) gives an evac time of 4.5 minutes or an 83% decrease in evac time. At a flow rate of 1 bpm this same fluid produces an evac time of 23 minutes or an increase of 411% over the same fluid pumped at 2 bpm (0.32 m$^3$/min). These same characteristics are seen with the anti-cling fluid composed of 9.0 ppg (1.1 kg/liter) KCl brine, 2% Surfactant C, and buffered to pH=4. The evac time at 2 bpm (0.32 m$^3$/min) for test #1 is 2 minutes and for test #2 is 5 minutes—Examples 10 and 11. These two tests give an average of 3.5 minutes which is a decrease of 87% compared to the baseline. At a flow rate of 1 bpm (0.16 m$^3$/min) this same fluid produces an evac time of 25 minutes or an increase of 400–600% over the same fluid at 2 bpm (0.32 m$^3$/min) which is similar to the anti-cling fluid containing only brine and acetic acid buffer.

TABLE I

Anti-Cling Simulator Tests

| Ex. | Anti-Cling Fluid (PASF) | Time to Evacuate, Min. | Volume of PASF Pumped, bbls (m$^3$) |
|---|---|---|---|
| 1 | 9.0 ppg (1.1 kg/liter) KCl, 2 bpm (0.32 m$^3$/min)* | 26 | 52 (8.3) |
| 2 | 9.0 ppg (1.1 kg/liter) KCl, acetic acid to pH = 4, 1 bpm (0.16 m$^3$/min) | 23 | 23 (3.7) |
| 3 | 9.0 ppg (1.1 kg/liter) KCl, acetic acid to pH = 4, 2 bpm (0.32 m$^3$/min) | 4.5 | 9 (1.4) |
| 4 | 9.0 ppg (1.1 kg/liter) KCl, 0.5% Surfactant A, acetic acid to pH = 4, 2 bpm (0.32 m$^3$/min)** | 6.5 | 13.9 (2.21) |
| 5 | 9.0 ppg (1.1 kg/liter) KCl, 1% Surfactant D, acetic acid to pH = 4, 2 bpm (0.32 m$^3$/min) | 2.25 | 4.5 (0.71) |
| 6 | 9.0 ppg (1.1 kg/liter) KCl, 1% Surfactant E, acetic acid to pH = 4, 2 bpm (0.32 m$^3$/min) | 0.75 | 1.5 (0.24) |
| 7 | 9.0 ppg (1.1 kg/liter) KCl, 1% Surfactant A, acetic acid to pH = 4, 2 bpm (0.32 m$^3$/min) | 5.67 | 11.33 (1.8) |
| 8 | 9.0 ppg (1.1 kg/liter) KCl, 1% Surfactant A, 1% Surfactant B, acetic acid to pH = 4, 2 bpm (0.32 m$^3$/min) | 2.83 | 5.7 (0.91) |
| 9 | 9.0 ppg (1.1 kg/liter) KCl, 2% Surfactant C, acetic acid to pH = 4 (0.2% bv HA), 1 bpm (0.16 m$^3$/min) | 25 | 25 (3.97) |
| 10 | 9.0 ppg (1.1 kg/liter) KCl, 2% Surfactant C, acetic acid to pH = 4 (0.2% bv HA), 2 bpm (0.32 m$^3$/min) | 2 | 4 (0.64) |
| 11 | 9.0 ppg (1.1 kg/liter) KCl, 2% Sufactant C, acetic acid to pH = 4 (0.2% bv HA), 2 bpm (0.32 m$^3$/min) (Demo) | 5 | 10 (1.6) |
| 12 | 10.5 ppg (1.26 kg/liter) CaCl$_2$, 2 bpm (0.32 m$^3$/min) | 17.7 | 35.4 (5.63) |
| 13 | 10.5 ppg (1.26 kg/liter) CaCl$_2$, 1% Surfactant F, 1% Surfactant G, 1% Surfactant B, acetic acid to pH = 4, 2 bpm (0.32 m$^3$/min) | 3.75 | 7.5 (1.2) |
| 14 | 10.5 ppg (1.26 kg/liter) CaCl$_2$, 1% Surfactant F, 1% Surfactant B, acetic acid to pH = 4, 2 bpm (0.32 m$^3$/min) | 6.83 | 13.7 (2.18) |
| 15 | 10.5 ppg (1.26 kg/liter) CaCl$_2$, 1% Surfactant A, 1% Surfactant B, acetic acid to pH = 4, 2 bpm (0.32 m$^3$/min) | 4.08 | 8.2 (1.3) |
| 16 | 10.5 ppg (1.26 kg/liter) CaCl$_2$, 2% Surfactant C, acetic acid to pH = 4 (0.2% bv HA), 2 bpm (0.32 m$^3$/min) | 4.25 | 8.5 (1.4) |
| 17 | 10.5 ppg (1.26 kg/liter) CaCl$_2$, 3% Surfactant H#, 2 bpm (0.32 m$^3$/min) | 22.5 | 46 (7.3) |

TABLE I-continued

Anti-Cling Simulator Tests

| Ex. Anti-Cling Fluid (PASF) | Time to Evacuate, Min. | Volume of PASF Pumped, bbls (m³) |
|---|---|---|
| 18 Fresh water, initial evac pressure = 70 psig (483 kPa) and not 40 psig (276 kPa) as in other tests<sup>##</sup>, 2 bpm (0.32 m³/min) | 12.5 | 29 (4.6) |

Notes to Table I:
Unless otherwise stated, initial evac pressure is 40 psig (276 kPa) (pressure put on tool before stroke to evac position). Once evac flow is initiated, the flow rate is taken to 2 bpm (0.32 m³/min). At 2 bpm (0.32 m³/min) pressure is approximately 60 psig (414 kPa).
20/40 ceramic proppant was used in all Examples.
*0–17 min. @ 2 bpm (0.32 m³/min), 60 psig (414 kPa); 17–19.5 min. @ 2.3 bpm, 70 psig; 19.5–26 min. @ 2 bpm (0.32 m³min), 60 psig (414 kPa) and pH = 4 w/ acetic acid.
**0–4.67 min. @ 2 bpm (0.32 m³/min), 60 psig (414 kPa); 4.67–6.5 min. @ 2.5 bpm (0.32 m³/min), 80 psig (552 kPa).
0–11 min. @ 2 bpm (0.32 m³/min), 60 psig (414 kPa); 11–19 min. pH to 5.5 w/ acetic acid; 19–22.5 min. @ 2.4 bpm (0.38 m³/min), 70 psig (483 kPa).
0–9 min. @ 2.3 bpm (0.37 m³/min), 70 psig (483 kPa); 9–12.5 min. pH to 4 w/ acetic acid.
HA refers to acetic acid With the variability of packing the tool/acrylic window annulus with CCS, qualitatively judging the tests for trends becomes important. From the trends seen in the test results several conclusions were reached.

One of the more important steps that should be taken to produce an anti-cling fluid that will remove CCS from the tool/blast liner annulus is to reduce the pH of the anti-cling fluid to approximately 4, in one non-limiting embodiment.

Another important step that should be considered in removing CCS from the tool/blast liner annulus is to maximize evac rate through the tool. It was observed in testing that as the anti-cling fluid flow rate or velocity increased the anti-cling fluid volume needed decreased because of decreasing contact or removal times.

While a drop in brine pH to 4 alone is sufficient to produce an anti-cling fluid that will efficiently remove CCS in the anti-cling simulator in many non-limiting embodiments, surface tension reduction by addition of surfactants will add to the penetrating capabilities (penetration of the fluid/metal interface) of the anti-cling fluid. This could become more important at the much higher pressures and pressure differentials seen during downhole operations. Also, if there are any static charges on the downhole tool assembly that were not reproduced in the anti-cling simulator, an anti-cling fluid that includes a surfactant will be better able to neutralize those static charges.

In the foregoing specification, the invention has been described with reference to specific embodiments thereof. The fluids of this invention would be expected to be useful in other hydrocarbon recovery operations besides frac packs and gravel packs, indeed, in any operation involving proppants or other particulates that may inhibit or prevent the movement of a tool. It will be evident that various modifications and changes can be made to the methods and fluids of the invention without departing from the broader spirit or scope of the invention as set forth in the appended claims. Accordingly, the specification is to be regarded in an illustrative rather than a restrictive sense. For example, specific proppant anti-sticking fluid components and proportions thereof falling within the claimed parameters, but not specifically identified or tried in particular compositions, are anticipated and expected to be within the scope of this invention.

We claim:

1. A method of mitigating proppant sticking in a downhole fracturing or gravel packing operation comprising:
    placing a proppant anti-sticking fluid in a downhole space, where the proppant anti-sticking fluid comprises:
        a diluent;
    conducting a fracturing or gravel packing operation comprising passing a carrier fluid including a proppant through a tool system;
    flushing the proppant anti-sticking fluid through the tool system to contact carrier fluid arid the proppant and to clear the proppant from the tool system; and
    removing the tool system from downhole.

2. The method of claim 1 where in placing the proppant anti-sticking fluid, the proppant anti-sticking fluid comprises a compound to reduce surface tension.

3. The method of claim 2 where the compound to reduce surface tension is a surfactant.

4. The method of claim 1 where in placing the proppant anti-sticking fluid, the proppant anti-sticking fluid comprises an anti-static compound.

5. The method of claim 1 where in placing the proppant anti-sticking fluid, the proppant anti-sticking fluid comprises a brine.

6. The method of claim 1 where in placing the proppant anti-sticking fluid, the proppant is selected from the group consisting of ceramic material, bauxite material, sand, composite materials, and combinations thereof.

7. The method of claim 1 further comprising gelling the carrier fluid, and where in placing the proppant anti-sticking fluid, the proppant anti-sticking fluid further comprises a gel-breaking component that is an acid.

8. The method of claim 7 where the acid is an organic acid.

9. The method of claim 1 further comprising gelling the carrier fluid, and where gelling the carrier fluid comprises crosslinking a polymeric gel.

10. A method of mitigating proppant sticking in a downhole fracturing or gravel packing operation comprising:
    placing a proppant anti-sticking fluid in a downhole space, where the proppant anti-sticking fluid comprises:
        a brine diluent, and
        at least one surfactant;

conducting a fracturing or gravel packing operation comprising passing a carrier fluid including a proppant through a tool system;

flushing the proppant anti-sticking fluid through the tool system to contact carrier fluid and the proppant and to clear the proppant from the tool system; and removing the tool system from downhole.

11. The method of claim 10 where in placing the proppant anti-sticking fluid, the proppant anti-sticking fluid comprises an anti-static compound different from the surfactant present.

12. The method of claim 10 where in placing the proppant anti-sticking fluid, the proppant is selected from the group consisting of ceramic material, bauxite material, sand, composite materials, and combinations thereof.

13. The method of claim 10 further comprising gelling the carrier fluid, and where in placing the proppant anti-sticking fluid, the proppant anti-sticking fluid further comprises a gel-breaking component that is an acid.

14. The method of claim 13 where the acid is an organic acid.

15. The method of claim 10 further comprising gelling the carrier fluid, and where gelling the carrier fluid comprises crosslinking a polymeric gel.

16. A method of mitigating proppant sticking in a downhole fracturing or gravel packing operation comprising:

placing a proppant anti-sticking fluid in a downhole space, where the proppant anti-sticking fluid comprises:

a brine diluent, a gel-breaking effective amount of an acid, and at least one surfactant;

gelling the carrier fluid;

conducting a fracturing or gravel packing operation comprising passing a carrier fluid including a proppant through a tool system;

flushing the proppant anti-sticking fluid through the tool system to contact gelled carrier fluid and the proppant and to substantially break the gel and clear the proppant from the tool system, where the proppant is selected from the group consisting of ceramic material, bauxite material, sand, composite materials, and combinations thereof; and removing the tool system from downhole.

17. The method of claim 16 where in placing the proppant anti-sticking fluid, the proppant anti-sticking fluid comprises an anti-static compound different from any surfactant present.

18. The method of claim 16 where the acid is an organic acid.

19. The method of claim 16 where gelling the carrier fluid comprises crosslinking a polymeric gel.

* * * * *

UNITED STATES PATENT AND TRADEMARK OFFICE
CERTIFICATE OF CORRECTION

PATENT NO. : 6,923,260 B2  
APPLICATION NO. : 10/438384  
DATED : August 2, 2005  
INVENTOR(S) : Martin P. Coronado and William Russell Wood

It is certified that error appears in the above-identified patent and that said Letters Patent is hereby corrected as shown below:

Column 8, Table I, Ex. 11, delete "Sufactant" and insert -- Surfactant --.

Column 10, line 34, claim 1, delete "arid" and insert -- and --.

Signed and Sealed this

Thirtieth Day of January, 2007

JON W. DUDAS  
*Director of the United States Patent and Trademark Office*